(12) United States Patent
Itoh et al.

(10) Patent No.: US 7,023,786 B2
(45) Date of Patent: Apr. 4, 2006

(54) HOLOGRAM RECORDING AND REPRODUCING APPARATUS

(75) Inventors: Yoshihisa Itoh, Tsurugashima (JP); Hajime Matsushita, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 534 days.

(21) Appl. No.: 09/978,076

(22) Filed: Oct. 17, 2001

(65) Prior Publication Data
US 2002/0051419 A1   May 2, 2002

(30) Foreign Application Priority Data
Oct. 17, 2000   (JP)   ............................. 2000-316117

(51) Int. Cl.
*G11B 7/00* (2006.01)
(52) U.S. Cl. ..................................... 369/103
(58) Field of Classification Search ................ 369/103, 369/112.17, 112.29, 117, 118
See application file for complete search history.

(56) References Cited

U.S. PATENT DOCUMENTS

| | | | | |
|---|---|---|---|---|
| 4,908,815 A * | 3/1990 | Gregg et al. | ................. | 369/116 |
| 4,993,789 A * | 2/1991 | Biles et al. | .................... | 359/15 |
| 6,272,095 B1 * | 8/2001 | Liu et al. | ..................... | 369/103 |
| 6,373,806 B1 * | 4/2002 | Kitamura et al. | ........... | 369/103 |
| 6,452,890 B1 * | 9/2002 | Kawano et al. | ......... | 369/110.01 |
| 6,535,472 B1 * | 3/2003 | Lee et al. | .................... | 369/103 |
| 2002/0163872 A1 * | 11/2002 | Roh et al. | .................... | 369/103 |

* cited by examiner

*Primary Examiner*—Brian E. Miller
*Assistant Examiner*—Peter Vincent Agustin
(74) *Attorney, Agent, or Firm*—Sughrue Mion, PLLC

(57) ABSTRACT

A hologram recording and reproducing apparatus preforms to record data on a recording medium and reproduce data from the recording medium. The recording medium is made of a photorefractive crystal having a parallel plate shape. The apparatus includes: a support portion for detachably supporting and rotating the recording medium; a recording-reference-light-beam-supplying-portion for supplying a coherent recording reference light beam propagating along an optical axis to a major surface of the recording medium; a signal-light-beam-supplying-portion for supplying a coherent signal light beam which is modulated in accordance with image data, in an optical path into the recording medium such that the signal light beam intersects with the reference light beam to produce an optical interference pattern with the reference and signal light beams within the recording medium; a reproducing-reference-light-beam-supplying-portion for supplying into the recording medium a coherent reproducing reference light beam propagating in an opposite direction along the optical axis of the recording reference light beam to generate a phase conjugation wave from a refractive-index grating of the light interference pattern; a splitting portion for splitting the phase conjugation wave from the optical path of the signal light beam to image a dot pattern with the phase conjugation wave; a photo-detecting portion for detecting the dot pattern imaged with the phase conjugation wave to reproduce the image data.

5 Claims, 6 Drawing Sheets

HOLOGRAM RECORDING AND REPRODUCING APPARATUS

BACKGROUND OF THE INVENTION

1. Field of the Invention

The present invention relates to an optical information recording and reproducing apparatus utilizing a recording medium formed of a photorefractive material, i.e. so-called a holographic memory.

2. Description of the Related Art

A holographic memory system is known as a digital information recording system which applies the principle of holography. The information recording system is characterized by recording information signals recorded on a recording medium as optical signals. For the recording medium, a photorefractive crystal such as lithium niobate single crystals are used.

There is a conventional holographic recording and reproducing method utilizing the Fourier transform.

FIG. 1 shows a conventional 4f-based holographic recording and reproducing apparatus. A laser light beam 12 emitted from a laser light source 11 is split into a signal light beam 12a and a reference light beam 12b in a beam splitter 13. The signal light beam 12a is expanded in its diameter by a beam expander 14 as a collimated light beam, and then irradiated to a spatial light modulator (hereinafter abbreviated as "SLM") 15 including a dot matrix panel such as a transmission-type TFT liquid crystal display (LCD) panel to which image data to be recorded are provided which are converted by an encoder as electric signals. Thus, the panel forms a bright and dark dot pattern on its plane corresponding to the image data. The signal light beam 12a is optically converted by the SLM 15 to include data signal components. The signal light beam 12a including dot pattern signal components passes through a Fourier transforming lens 16 which is positioned at a focal distance f apart from the SLM 15. The Fourier transforming lens 16 performs Fourier transformation and then the signal light beam 12a including dot pattern signal components is converged into a recording medium 10. On the other hand, the reference light beam 12b split from the beam splitter 13 is guided to the recording medium 10 by a fixed mirror 17 and a rotary mirror 17a, and intersects an optical path of the signal light beam 12a within the recording medium 10 to form a light interference pattern. The recording medium 10 made of a photorefractive crystal records the spatial intensity modulation represented by the light intensity of the light interference pattern as changes in refractive index.

In the foregoing manner, the diffraction light from the image data illuminated by a coherent collimated light is focused through the Fourier transforming lens 16 and changed into a distribution on the focal plane, or Fourier plane. The distribution as a result of Fourier transformation is interfered with the coherent reference light to record an interference fringe thereof to the recording medium placed in the vicinity of the focal point. Ending the record of the first page, the rotary mirror 17a is rotated a predetermined amount and parallel moved in position a predetermined amount so that the incident angle of the recording reference light beam 12b on the recording medium 10 is changed to record the second page by the same procedure. In this way, the angle-multiplexed recording is carried out with sequential recording as the above.

In reproducing information, on the other hand, inverse Fourier transformation is carried out to reproduce a dot-pattern image. As shown in FIG. 1 the optical path of the signal light beam 12a is cut off, for example, by the SLM 15 to illuminate only the recording reference light beam 12b to the recording medium 10. In order to make incident the recording reference light beam 12b on the medium at the same angle as the recording reference light of upon recording the page to be reproduced, the rotary mirror 17a is changed and controlled in position and angle by the combination of mirror rotation and parallel movement. Reproductive light of the recorded interference pattern appears at an opposite side of the recording medium 10 to the side illuminated by the signal light beam 12a. If the reproduced light is guided to and inverse-Fourier-transformed by an inverse Fourier transforming lens 16a, the dot-pattern signal can be reproduced. Furthermore, if the inverse Fourier transforming lens 16a images the dot-pattern signal on an imaging device or photodetector 20 using a CCD (Charge Coupled Device) or CMOS sensor arranged in the focal point, and reconverted into an electric digital data signal and then sent to a decoder, the original data is reproduced.

In this manner, the conventional apparatus requires a high-performance Fourier transforming lens and inverse Fourier transforming lens. Accordingly, there is a problem with the disadvantage for system size reduction.

Meanwhile, there is a reproducing method with a phase conjugation wave as one of the methods of reducing the size of a hologram memory system. In order to realize a reproducing method with a phase conjugation wave, a reference light upon recording (described as reproducing reference light) that is phase-conjugative to the reference light upon recording (described as recording reference light) can be generated by a phase conjugation mirror. However, it is not easy to realize such a phase conjugation mirror.

OBJECT AND SUMMARY OF THE INVENTION

It is therefore an object of the present invention to provide a hologram recording and reproducing apparatus which is capable of recording a hologram in a holographic memory at a high density and capable of being miniaturized.

According to the present invention, there is provided a hologram recording and reproducing apparatus for recording data on a recording medium and reproducing data from the recording medium, the recording medium being made of a photorefractive crystal having a parallel plate shape, said apparatus comprising:

a support portion for detachably supporting and rotating the recording medium;

a recording-reference-light-beam-supplying-portion for supplying a coherent recording reference light beam propagating along an optical axis to a major surface of said recording medium;

a signal-light-beam-supplying-portion for supplying a coherent signal light beam which is modulated in accordance with image data, in an optical path into the recording medium such that said signal light beam intersects with the reference light beam to produce an optical interference pattern with said reference and signal light beams within said recording medium;

a reproducing-reference-light-beam-supplying-portion for supplying into the recording medium a coherent reproducing reference light beam propagating in an opposite direction along said optical axis of the recording reference light beam to generate a phase conjugation wave from a refractive-index grating of the light interference pattern;

a splitting portion for splitting the phase conjugation wave from the optical path of said signal light beam to image a dot pattern with the phase conjugation wave; and a photo-detecting portion for detecting the dot pattern imaged with said phase conjugation wave to reproduce the image data.

According to one aspect of the present invention, said reproducing reference light beam has an across-section having an area larger than that of said recording reference light beam.

According to another aspect of the present invention, said reproducing-reference-light-beam-supplying-portion includes a reflector for reflecting the recording reference light beam passing through said recording medium back to said recording medium; and a shutter capable of cutting off said recording reference light beam and disposed in the optical path to said reflector.

According to a further aspect of the present invention, the hologram recording and reproducing apparatus further comprises a ½ wave plate disposed in the optical path of said reproducing reference light beam.

According to a still further aspect of the present invention, said reproducing-reference-light-beam-supplying-portion includes a reflector for reflecting the recording reference light beam passing through said recording medium back to said recording medium; and a ¼ wave plate disposed in the optical path to said reflector.

According to another aspect of the present invention, when said recording medium is sensitive to gate light having a wavelength shorter than that of the reference and signal light beams to develop light induced absorption, said apparatus further comprising a gate-light-beam-supplying-portion for supplying the gate light beam into the recording medium.

DETAILED DESCRIPTION OF THE PREFERRED EMBODIMENTS

Preferred embodiments according to the present invention will be described with reference to the accompanying drawings hereinafter.

Figure 1:
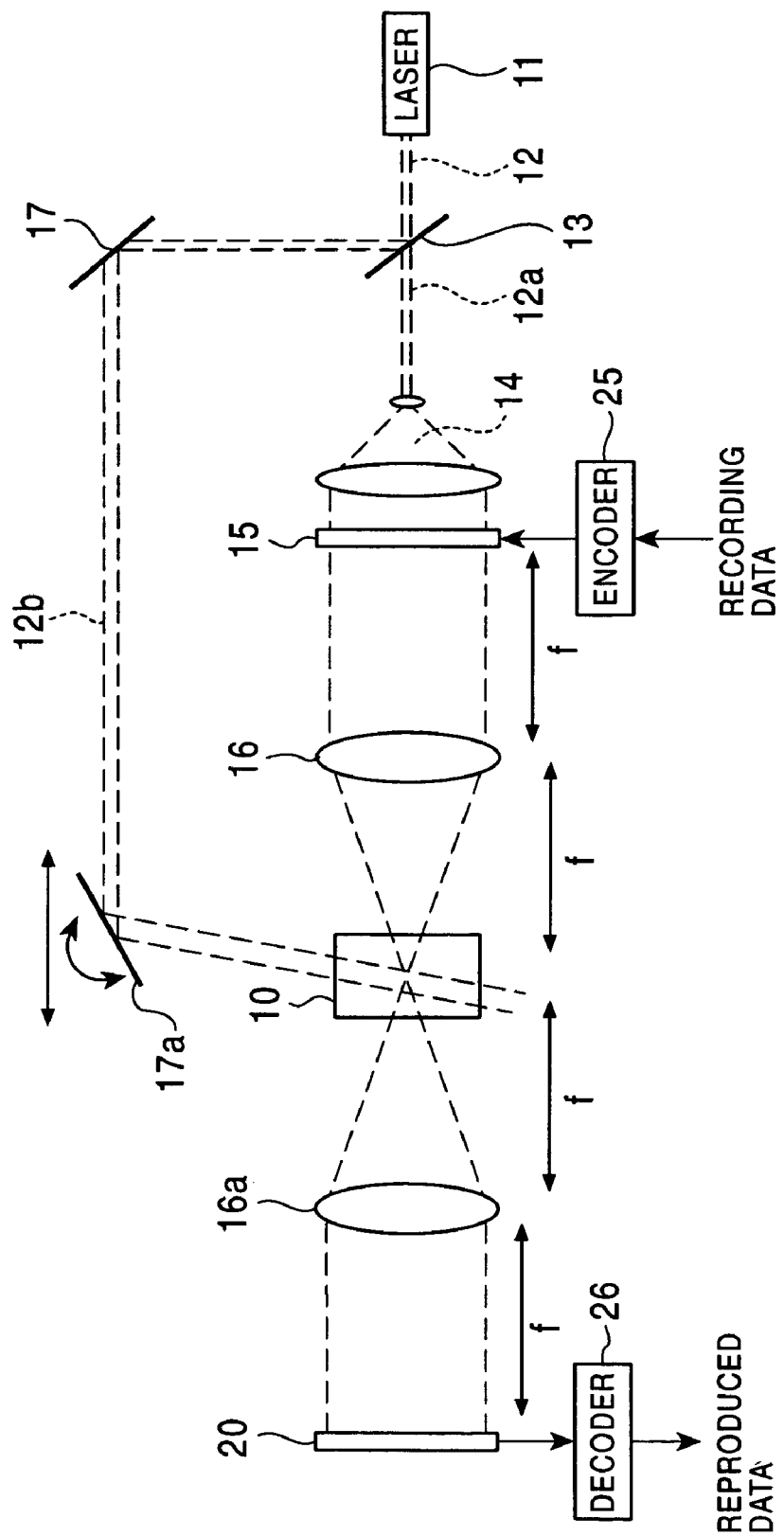
FIG. 1 is a diagram illustrating the structure of a conventional volume holographic memory system.
Figure 2:
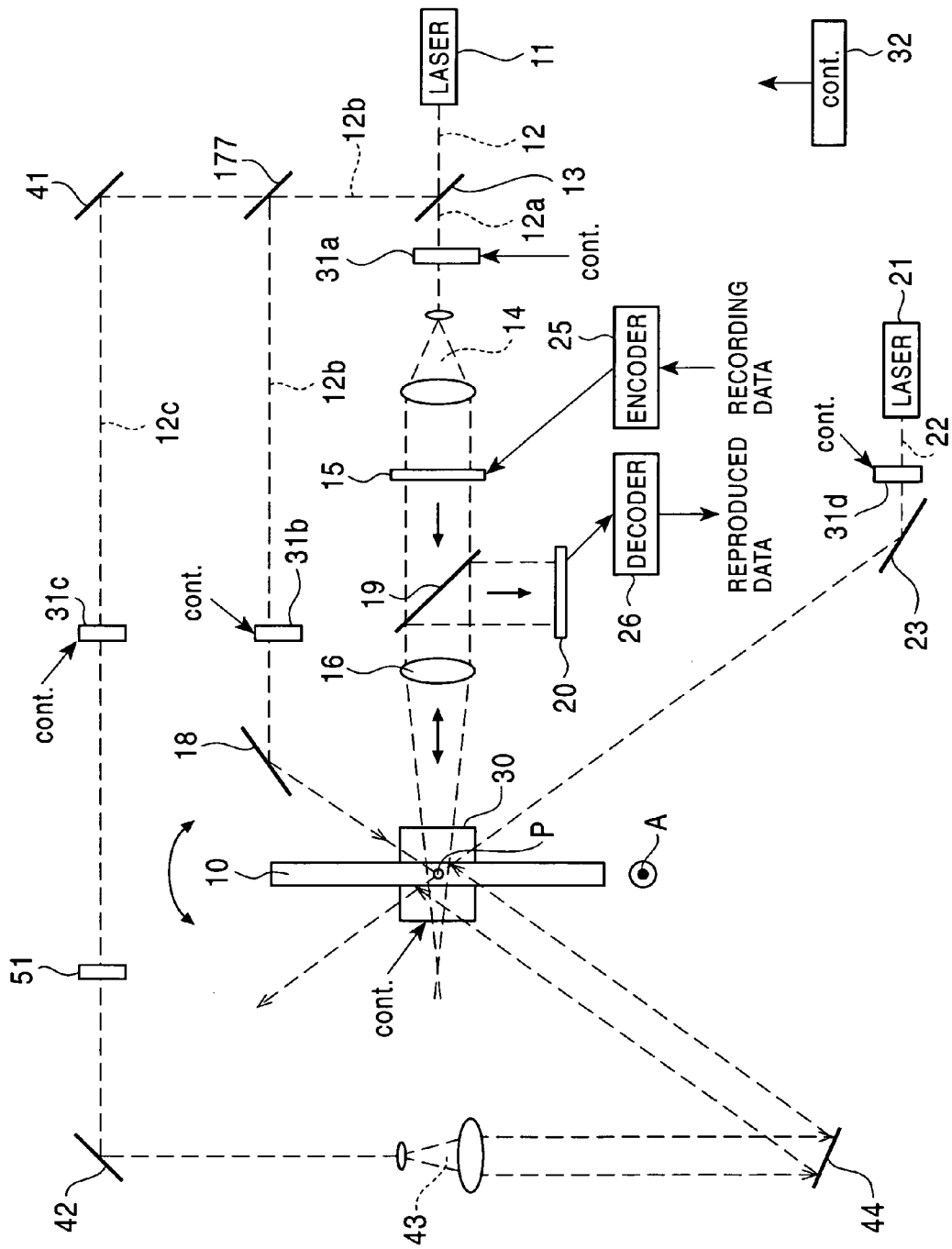
FIG. 2 is a plan view illustrating the structure of a hologram recording and reproducing apparatus according to the present invention.

As shown in FIG. 2, a light source 11 of e.g. a wavelength of 532 nm for generation of signal light and reference light is a combination of a YAG laser and a SHG device. A laser light beam 12 emitted from the light source 11 is split into a signal light beam 12a and a recording reference light beam 12b by a beam splitter 13. The signal light beam 12a and the recording reference light beam 12b are guided and irradiated to the same position P in a recording medium 10 by way of different optical paths, respectively.

On the optical path of the signal light beam 12a, arranged are a shutter 31a, a beam expander 14, an SLM 15, a beam splitter 19 and a Fourier transforming lens 16. The shutters 31a, 31b and 31c are provided to open and close the optical paths of light beams 12a, 12b and 12c, respectively. These shutters are driven to open and close by the corresponding drivers (not shown) in response to signals forwarded from a controller 32. The beam expander 14 magnifies the beam diameter of the signal light beam 12a which passes through the shutter 31a to make a collimated ray to be incident at a predetermined angle e.g. right angle on the SLM 15. The SLM 15 is connected to an encoder 25 to receive the electric data in a unitary page series corresponding to a two-dimensional page received by the latter, and then forms a bright and dark dot pattern on its plane panel corresponding to the image data. The passed signal light beam 12a is optically modulated by the SLM 15, to contain data as a dot-matrix component. The Fourier transforming lens 16 performs Fourier transformation on the dot-matrix component of the signal light beam 12a passing the beam splitter 19 and focuses it slightly in the front or back of the position P in the recording medium 10. The beam splitter 19 provides a generated phase conjugation wave (which will be described below) to a CCD 20 of an optical receiver.

Furthermore, the CCD 20 is disposed on an optical path diverged from the beam splitter 19 and has an analyzer to reproduce the dot-matrix signal including the bright and dark dot pattern. The beam splitter 19 is positioned so as to forward the phase conjugation wave to the CCD 20. In other words, the SLM 15 and the CCD 20 are disposed along the focal plane of the Fourier transforming lens 16 (conjugate position) and the planes of the SLM 15 and the CCD 20 are symmetric with respect to a reflective plane of the beam splitter 19. The CCD 20 is electrically connected to a decoder 26. In addition, a tag corresponding to the type of a particular photo-refractive crystal may be previously attached to the recording medium 10, such that the tag is automatically read by a suitable sensor as the recording medium 10 is mounted on a movable stage 30 to allow the controller 32 to control vertical movements and rotation of the recording medium 10.

During the information recording, the recording reference light beam 12b is guided by a beam splitter 177 and a fixed mirror 18 (reflectors) into the recording medium 10, so that only both the signal light beam 12a and the recording reference light beam 12b are irradiated into the position P of the medium 10. A shutter 31b is disposed between the beam splitter 177 and the mirror 18 so that the optical path of the recording reference light beam 12b can be opened and closed. The shutter 31b is driven to open and close by a driver in response to a signal sent from the controller 32.

As described above, a light interference pattern is formed by the reference light and the signal light in a region at the position P within the recording medium 10, and information is recorded therein as a change in refractive index. In this case of the recording with interference of the recording reference light beam 12b and the signal light beam 12a, the reproducing reference light beam 12c is cut off to prevent the illumination of the recording medium 10.

On the other hand, in the reproducing of information, the signal light beam 12a is cut off by the shutter 31a and also the recording reference light beam 12b by the shutter 31b, so that only the shutter 31c is opened to irradiate a reproducing reference light beam 12c to the region at the position P in the recording medium 10. The reproducing reference light beam 12c is previously generated by the beam splitter 177 in which it is divided from the light beam 12b. In the reproducing method using a phase conjugation wave, there is a need to make the recording reference light beam 12b and the reproducing reference light beam 12c in a symmetric or conjugate nature. For the both the two light beams, symmetrically opposite plane waves or spherical waves are used. Thus, the reproducing reference light beam 12c is supplied so as to illuminate the region P of the recording medium 10 at the opposite side of the recording medium 10 through the optical path of the beam splitter 177, a mirror 41 (reflector), the shutter 31c, a mirror 42 (reflector), the beam expander 43, and a mirror 44 (reflector). Namely, the reproducing reference light beam 12c is made incident on the recording medium 10 so as to propagate in the reverse propagating direction of the recording reference light beam 12b, since the reproducing and the recording reference light beams 12c and 12b are coaxial to each other, thereby causing a phase conjugation wave or reproductive light from the refractive-index grating of region P corresponding to the light interference pattern of the medium. Consequently, reproductive light from the region P appears in the same side of the recording medium 10 as the side illuminated by the signal light beam 12a. The interference pattern light (phase conjugation wave) propagates to the Fourier transforming lens 16. The Fourier transforming lens 16 receives the interference pattern light to the beam splitter 19. The reflecting plane of the beam splitter 19 reflects it to the photoelectric converting elements of the CCD 20 on which the bright and dark dot pattern is reproduced. That is, the Fourier transforming lens 16 reconstructs the bright and dark dot pattern on the CCD 20. The CCD 20 converts the dot pattern into an electric digital data signal. Then the CCD 20 forwards the data to the decoder 26 by which the original data is reproduced.

In carrying out of angle-multiplexed hologram recording, the recording medium 10 is rotated to change the relative angle between the recording reference light beam 12b and the recording medium 10. In one step of recording operation for a first page, the shutters 31a and 31b are opened to record the interference fringe caused by both the signal light beam 12a and the recording reference light beam 12b intersected at position P in the recording medium 10. After completing the recording of the first page of hologram, the recording medium 10 is rotated by a predetermined angular amount to change the incident angle of the recording reference light beam 12b on the recording medium 10. After that, recording of a second page of hologram is performed by the same procedure as the first page. In this way, the angle-multiplexed hologram recordings are carried out one after another. During the information reproducing from the hologram, the angle of the reproducing reference light beam 12c is controlled so as to be incident on a position immediately opposite to the recording light beam 12b upon recording the page to be reproduced.

Figure 3:
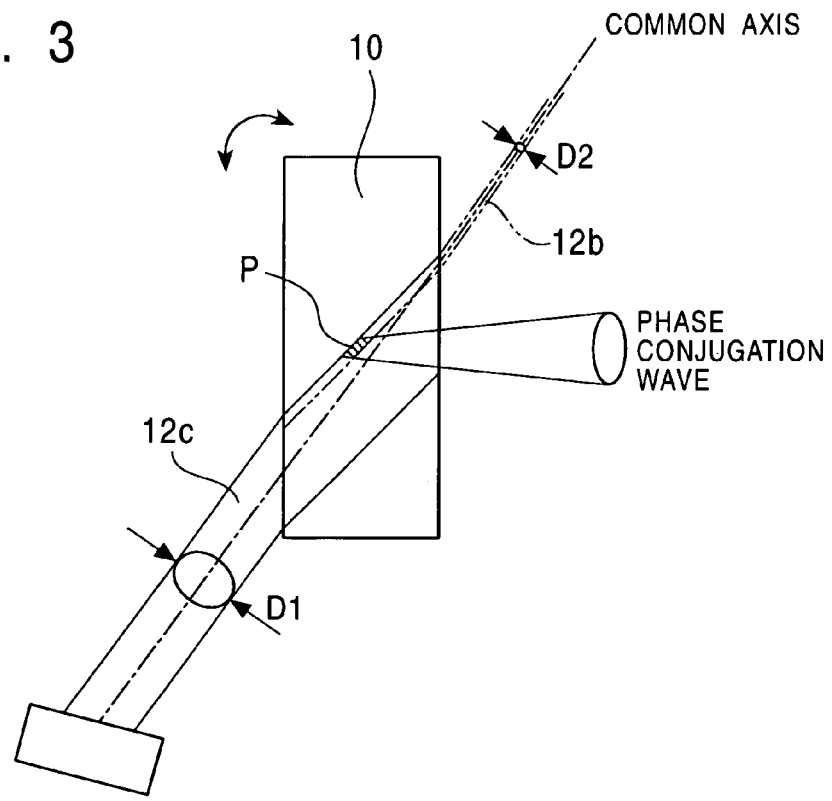
FIGS. 3 and 4 are enlarged plan views of FIG. 2 each illustrating a main point portion for explaining a reproducing step in a hologram recording and reproducing apparatus according to the present invention in which recording mediums are different in the angle with respect to light beams respectively.
Figure 4:
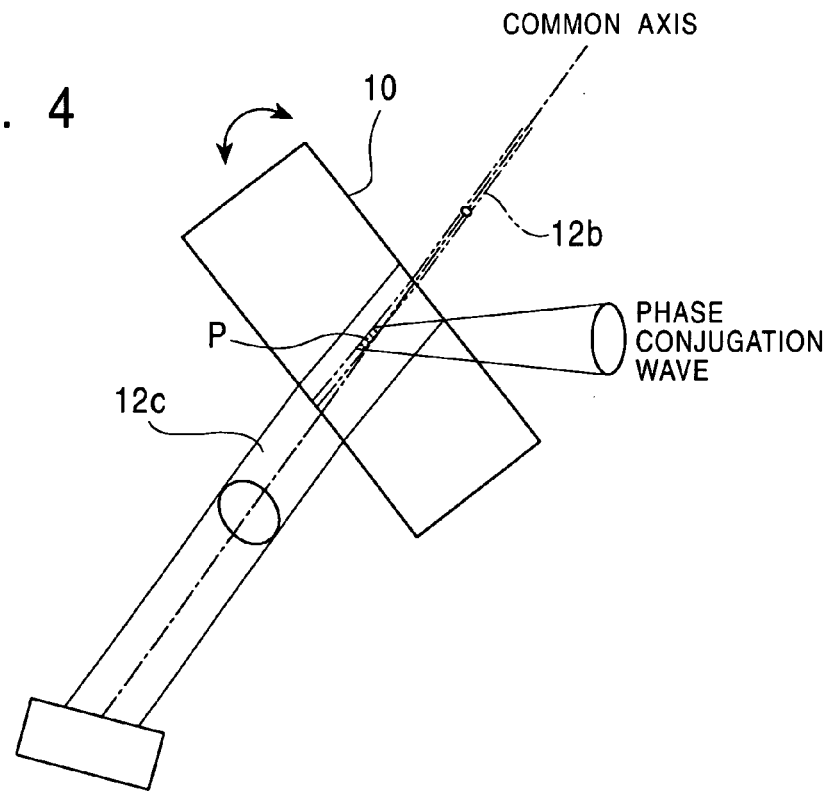

As shown in FIG. 2, the expander 43 disposed on the optical path of the reproducing reference light beam 12c of plane waves expands the diameter of the reference light beam 12c. Therefore, the diameter of the reproducing reference light beam 12c is greater than that of the recording reference light beam 12b positioned at the contrary side as shown in FIG. 3 (D1>D2). The recording medium 10 having the parallel plate shape is rotated about a rotational axis parallel to the major surface thereof. As shown in FIG. 4, when the parallel plate of the recording medium 10 is rotated and tilted in the midway of the plane-wave recording reference light beam 12b, the parallel movements of the optical axes of optical paths of the light beams 12b and 12c at the front and rear of the plate. Accordingly, since only the reproducing reference light beam 12c having a beam diameter somewhat greater than that of the recording reference light beam 12b is incident on the recording medium 10 during the information reproducing, it is possible to guide into the recording medium 10 a symmetric reproducing reference light beam 12c opposite to the recording reference light beam 12b, thereby facilitating to obtain diffraction light (phase conjugation light as reproduced light).

After the parallel plate recording medium 10 is rotated at a predetermined angle, next hologram reproducing is performed. This sequence is repeated. When the recording medium 10 is rotated and the recording of one sector is completed, the recording medium 10 in an amount of one sector is moved vertically (mark A) for recording in the similar way, as shown in FIG. 2. Alternatively, a simple rotational shifting mechanism may be employed in which after the recording medium 10 is vertically shifted per one rotation. In any case, it is not recordable at the same location of the front and back surface because of a rotational symmetry relationship. Thus, only one side recording and reproducing is possible.

In this way, the reproducing reference light beam 12c has an across-section having an area larger than that of the recording reference light beam 12b in the embodiment of the invention. Therefore, even if the angle-multiplexed hologram recording is performed in such a manner that the plate shape recording medium 10 is rotated in angular movements step by step and the data is recorded in each angular step and resulting in changing the optical path location of the recording reference light beam 12b in the recording medium 10 to move the region P to which the data is recorded, then the reproducing reference light beam 12c having a larger beam diameter covers any moved region P during the information reproducing. The across-section of the reproducing reference light beam 12c having the area larger than that of the recording reference light beam 12b provides a reliable symmetric propagation of the recording reference light beam 12b therewith in the recording medium 10, so that diffraction light (light as reproduced light) is obtained. As shown in FIG. 2, a ½ wave plate 51 may be disposed on the optical path of the reproducing reference light beam 12c, thereby changing the polarization direction of the reproducing reference light beam 12c by an angle of 90 degree. In this case, a polarization beam splitter should be employed together with a configuration that the polarization direction of the reproducing reference light beam 12c becomes an angle of 90 degree with respect to that of the recording reference light beam 12b (having the same polarization direction as signal light). As a result, the diffraction light (phase conjugation light as reproduced light) is effectively split from the optical path of the signal light.

Figure 5:
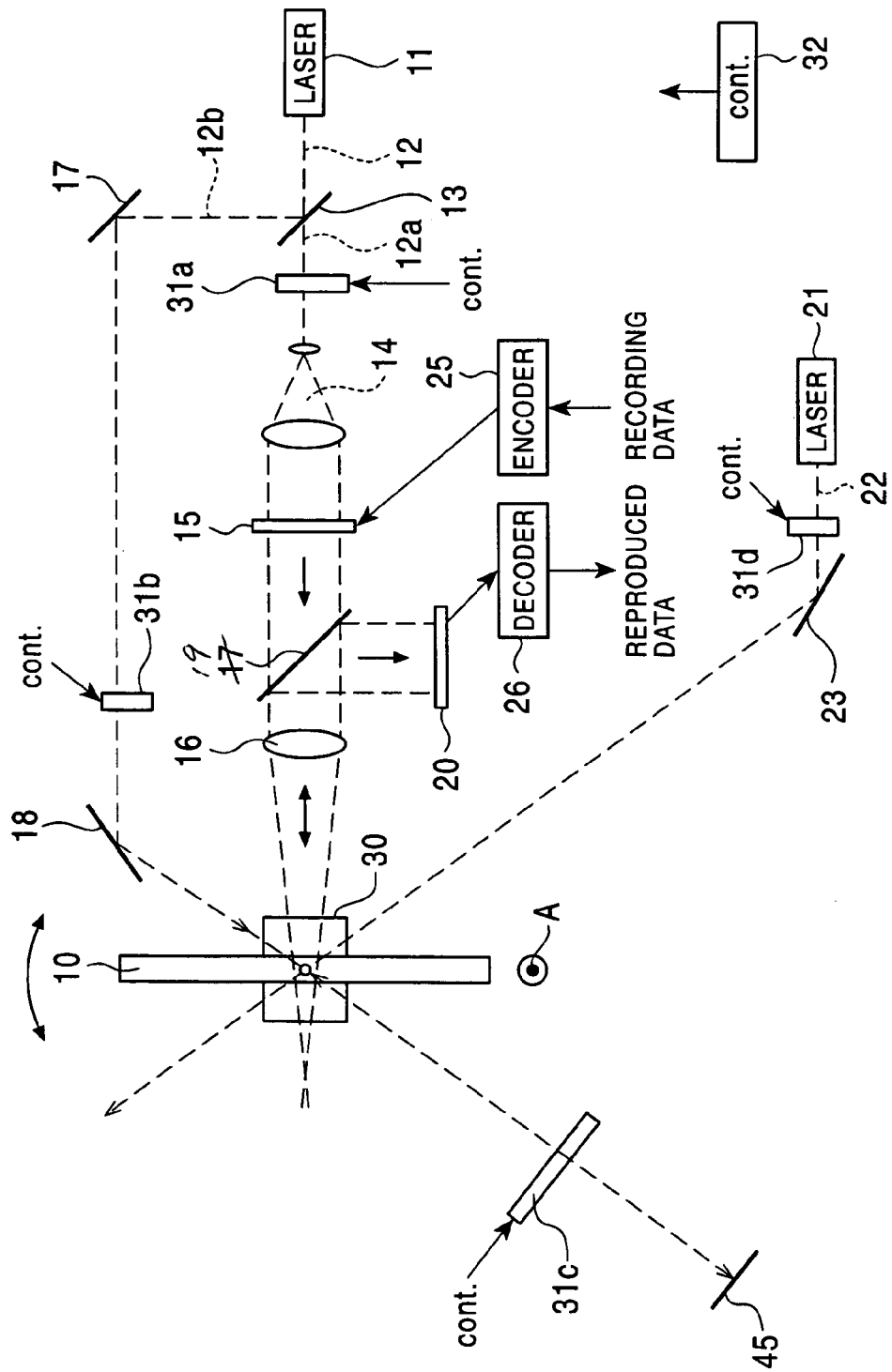
FIG. 5 is a plan view illustrating the structure of another embodiment of the hologram recording and reproducing apparatus according to the present invention.
Figure 6:
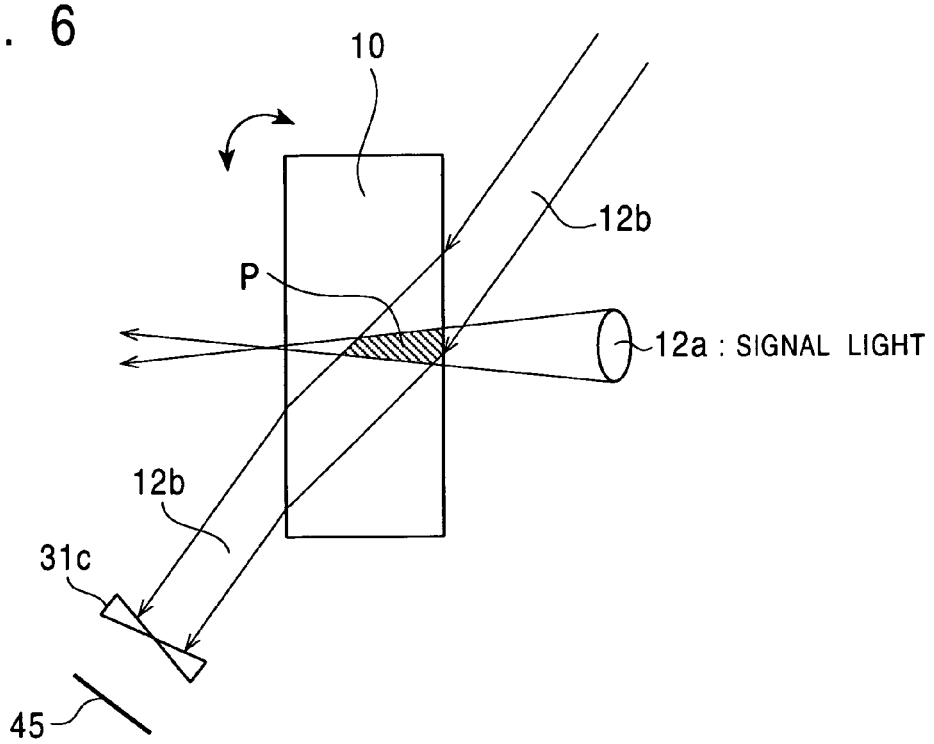
FIGS. 6 and 7 are enlarged plan views of FIG. 5 each illustrating a main point portion for explaining a reproducing step in a hologram recording and reproducing apparatus according to the present invention in which shutters are different in the operational mode respectively.
Figure 7:
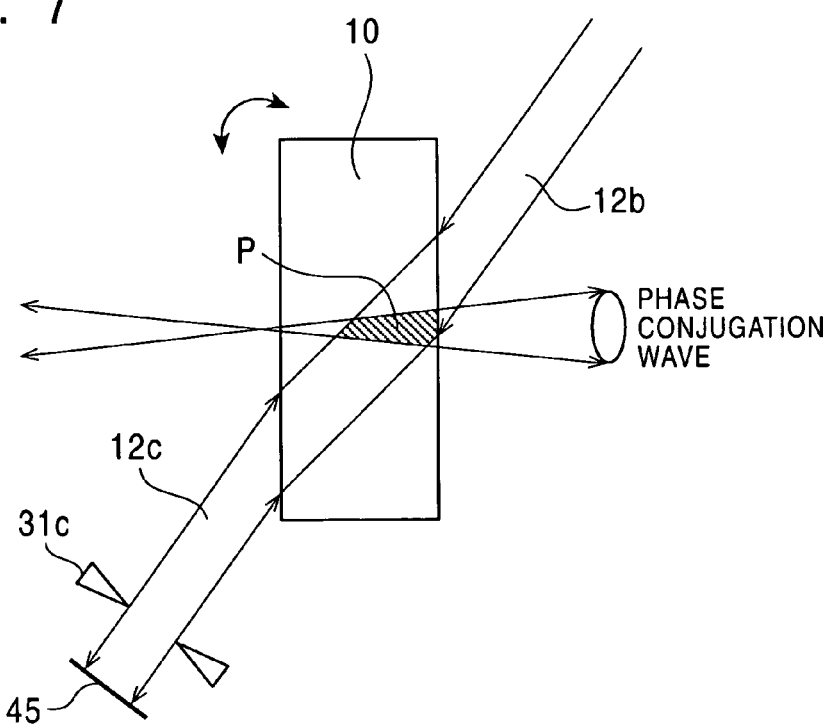

FIG. 5 shows another embodiment of the invention. This embodiment is the same as the embodiment described above except that a shutter 31c and a plane mirror 45 are provided at the opposite side of the recording reference light beam 12b so that the recording reference light beam 12b passing through the medium is incident perpendicular to the plane mirror 45 instead of the beam splitter 177, the mirror 41, the shutter 31c, the mirror 42, the beam expander 43, and the mirror 44 shown in FIG. 2. The parallel plate shape recording medium 10 is disposed to be rotatable about the rotational axis thereof between the mirror 18 and the plane mirror 45. As shown in FIG. 6, the shutter 31c is shut to the recording reference light beam 12b during the recording of data to prevent the reflection of the recording reference light beam 12b from the plane mirror 45, so that the recording reference light beam 12b is interfere with the signal light beam 12a for recording a hologram. As shown in FIG. 7, during the reproducing of data, only both the shutters 31b and 31c are opened to the recording reference light beam 12b, then the recording reference light beam 12b passes through the recording medium 10 to the plane mirror 45. The plane mirror 45 reflects the recording reference light beam 12b as a reproducing reference light beam 12c back to the recording medium 10. The reproducing reference light beam 12c exactly traces the optical path of the recording reference light beam 12b in the medium 10, diffraction light (phase conjugation wave as reproduced light) appears from the hologram region P of the recording medium 10. Of course, the signal light beam 12a is cut off during the reproduction step. The angle-multiplexed hologram recording is performed similarly to the first embodiment described above. During the information reproducing, as shown in FIG. 7, an image is normally reproduced from the hologram by the illumination of the recording reference light beam 12b, but it has no adverse influence on the system since the normally reproduced light propagates in the inverse direction relative to the optic for photo-detection. In the angle-multiplexed procedure, however the recording medium 10 is positioned at any angle with respect to the recording reference light beam 12b, the recording reference light beam 12b and the reproducing reference light beam 12c (reflected light from the plane mirror 45) always propagate along the same coaxial optical path. The shutter 31c disposed between the recording medium 10 and the plane mirror 45 is closed during the recording of the data to shut out reflected light from the plane mirror 45 (i.e., the reproducing reference light beam 12c) to prevent an adverse influence.

Figure 8:
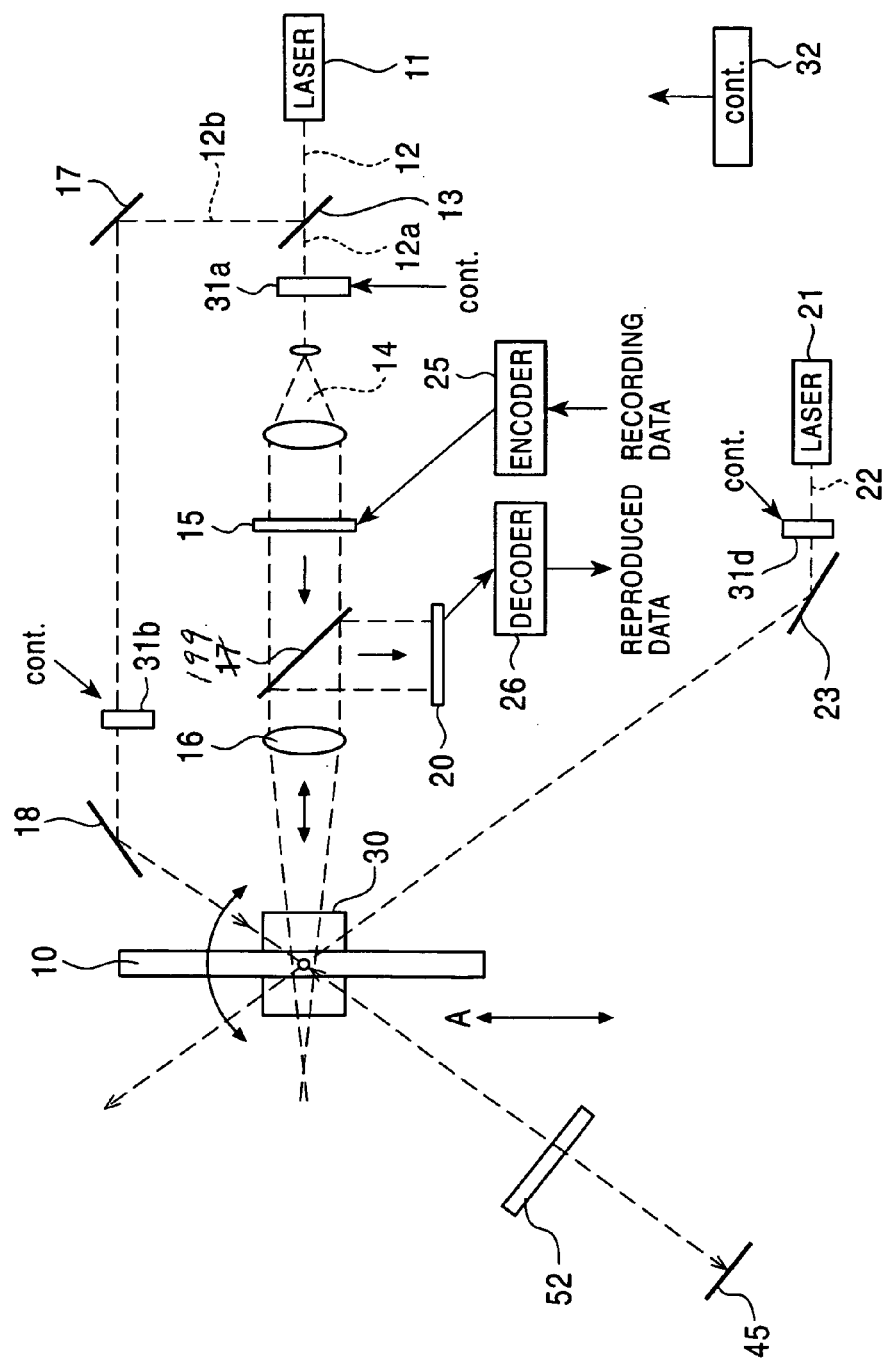
FIG. 8 is a plan view illustrating the structure of a further embodiment of the hologram recording and reproducing apparatus according to the present invention.

FIG. 8 shows a further embodiment of the invention. This embodiment is the same as the embodiment described above for FIG. 5 except that a ¼ wave plate 52 is disposed between the recording medium 10 and the plane mirror 45 instead of the shutter 31c shown in FIG. 5. The recording reference light beam 12b passing through the recording medium 10 and the ¼ wave plate 52 is reflected by the plane mirror 45 and then passes through the ¼ wave plate 52 again. Therefore, the polarization direction of the recording reference light beam 12b back to the recording medium 10 i.e., the reproducing reference light beam 12c changes by an angle of 90 degree from the original polarization. When the polarization direction of the recording reference light beam 12b (having the same polarization direction as the signal light) changes by an angle of 90 degree, then there is no interference to the signal light beam 12a with the reproducing reference light beam 12c in the recording medium 10 during the recording of data. The recording of hologram does not suffer from the reproducing reference light beam 12c (i.e., the reflected recording reference light beam 12b from the plane mirror 45). Therefore, any shutter is unnecessary between the recording medium 10 and the plane mirror 45. In addition, the polarization beam splitter 199 may be employed instead of the beam splitter 19 (FIG. 5) in order to separate diffraction light (phase conjugation light as reproduced light) to be introduced to the CCD 20 from the signal light beam 12a passing through the SLM 15. Therefore, the signal light for the recording medium 10 and the reproduced diffraction light for the CCD are effectively split by the polarization beam splitter 199 to reduce an optical loss.

In addition, a two-color hologram recording scheme may be employed to suffer from less reproduction deterioration.

The two-color hologram recording is characterized in that a hologram is recorded by simultaneously irradiating other light called "gate light" at a wavelength λ2, in addition to the reference and signal light beams at a wavelength λ1 for forming the hologram. The gate light acts to develop a recording sensitivity at the wavelength (λ1) of the recording light only during the irradiation of the gate light. Such a characteristic is based on the generation of carriers temporarily formed by the irradiated gate light at a relatively shallow energy state called an "intermediate excitation state" within a portion of the crystal irradiated with the gate light. The carriers at the intermediate excitation state are excited by the recording light (a spatial light/dark pattern corresponding to interference fringes formed by the reference light and the signal light), and finally accumulated in the form of a variable density distribution of the carriers corresponding to the interference fringes at a deep trap state. The latter process of the two-color hologram scheme, which is called the "photo-refractive effect," is in principle the same process as the single-color hologram. For example, with the two-color hologram recording scheme using crystals which are processed to be reduced to $LiNbO_3$ with no additive component or with Fe added thereto, and have a composition close to the stoichiometry (abbreviated as "SLN"), the lifetime of carriers at the intermediate excitation state (metastable state) can be extended from microseconds to seconds. Therefore, the two-color hologram recording makes it possible to use a continuous oscillating laser having relatively small power for recording.

The general configuration of the apparatus according to the embodiment is based on a conventional hologram recording apparatus using signal light and reference light of near infrared ray, i.e., a wavelength of 780 nm, and additionally comprises an ultraviolet ray irradiation unit for irradiating an ultraviolet ray or visible light in a short-wavelength range. The ultraviolet ray pre-irradiation unit may be incorporated in a one-piece body as illustrated in FIG. 2 such that a single light source irradiates ultraviolet rays through a light shutter or the like to the crystal. Alternatively, an ultraviolet light source may be provided as a unit separated from the hologram recording apparatus.

A hologram recording method employed in the embodiment includes an ultraviolet irradiating process, i.e., a so-called pre-irradiation which corresponds to an initialization process for a recording medium 10 which is performed before the recording medium 10 is irradiated with signal light and reference light.

Therefore, once the recording medium 10 is initialized, i.e., irradiated with ultraviolet rays for a predetermined time in the pre-irradiation, the recording/reproduction follows a procedure conforming to the conventional hologram recording and reproducing apparatus. The present invention reduces the reproduction deterioration in the multiplex recordings. Therefore, the invention provides a relaxed design for a scheduling of a recording time in the multiplex recordings, unlike the conventional recording scheme.

As illustrated in FIG. 2, a pre-irradiation light source 21 is an ultraviolet ray laser source generating a light beam at a second wavelength in an ultraviolet ray band or a short-wavelength visible light band, for example, at 313 nm (shorter than the reference and signal light beam). The light source 21 has a sufficient power to develop light induced absorption, i.e., coloring of the recording medium 10 by its irradiating light. A pre-irradiation light beam 22 emitted from the pre-irradiation light source 21 is irradiated through a shutter 31d and a mirror 23 to the entire recording medium 10 or at least a hologram recording portion. The shutter 31d is provided for opening and closing the optical path of the pre-irradiation light beam 22. The shutter 31d is driven to open and close through a driver in response to a signal sent by the controller 32. The pre-irradiation light source 21 may be a light source capable of converging the light beam onto the position P within the entire recording medium 10 while decreasing the diameter of its light spot.

As mentioned above, the invention includes a portion for carrying out the phase-conjugation-reading-out method in which the rotatable parallel plate recording medium 10 is disposed between the recording and the reproducing reference light beam 12b and 12c which are face-to-face with each other on the common optical axis, so that the recorded hologram is read out with the phase conjugation of the recording reference light propagating in the opposite direction as the one used for recording in the angle-multiplexed hologram recording method. By rotating the recording medium 10 in step angular movements and repeat to record data per one step, the angle-multiplexed hologram recording is simplified and the apparatus for the method is miniaturized. According to the invention, the recording reference light beam 12b and the reproducing reference light beam 12c are plane waves or as possible and these two light beams is made to propagating in the opposite direction to each other in the common optical axis, so that the reproducing reference light beam 12c is generated as phase conjugate light of the recording reference light beam 12b and incident to the recording medium 10. As a result, diffraction light (i.e., reconstruction light of the used signal light) appearing from the hologram propagates back along the direction from which it originally came.

A hologram recording is preformed in the usual manner between the signal and reference beams, but the hologram is read out by using the reproducing reference light beam 12c in phase conjugate with the recording reference light, propagating in the opposite direction as the one used for recording in the symmetric nature. Phase conjugation light of the signal light is generated from the hologram and propagates back along the direction from which the signal light originally came. Therefore the Fourier transforming lens 16 serves both as an imaging lens and an inverse Fourier transforming lens. In addition, even if the wavefronts of the reproduced light i.e., phase conjugation light are disordered in phase while passing through the recording medium 10, then the phase disorder is compensated when the phase conjugation light reversely passing through the recording medium 10, and the condition of the signal light is restored. This is a nature of phase conjugation light. Thus, the high performance for the Fourier transforming lens 16 is not required and a simplified lens configuration can be achieved. Further, if the hologram is recorded without imaging of the dot pattern in the invention method, then the miniaturized recording system can be achieved effectively.

In the recording and reproducing apparatus of the invention, the parallel plate shape recording medium is disposed rotatably between the planer recording light and the planer reproducing reference light which propagates along the common optical axis in the reverse direction to each other, the parallel plate shape recording medium is rotated in a step-wise angular rotation during the angle-multiplexed hologram recording. Therefore, the invention achieves a miniaturized memory system with an angle-multiplexed hologram recording using phase conjugation waves by using a simple medium-rotating mechanism unlike the conventional angle-multiplexed hologram recording including a light-deflecting mechanism in that the recording reference light is deflected by a rotary mirror.

Moreover, the embodiment of the invention includes a plane mirror reflecting the recording reference light in its normal line and generating the reproducing reference light without any optics guiding reproducing reference light to the medium. This causes a memory system with a simpler configuration.

In addition, the embodiment of the invention includes a configuration keeping the relationship of the polarization directions of both the reproducing reference light and the recording reference light (having the same polarization direction as the signal light) at an angle of 90 degree. During the recording of data, the reproducing reference light exerts no adverse influence the hologram, even if it enters the recording medium. Therefore, it is unnecessary to shut off the reproducing reference light. The hologram recording and reproducing apparatus according to the invention may include a polarization beam splitter for separating the signal light and diffraction light together with the configuration keeping a 90 degree polarization directions of both the reproducing reference light and the recording reference light, so that there is achieved a separating optics guiding an almost all modulated light by the SLM to the recording medium during the recording and introducing an almost all reproduced diffraction light to the CCD. Therefore, the apparatus is capable of using effectively the amount of light used and shortening the recording and reproducing periods.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2000-316117 which is hereby incorporated by reference.

What is claimed is:

1. A hologram recording and reproducing apparatus for recording data on a recording medium and reproducing data from the recording medium, the recording medium being made of a photorefractive crystal having a parallel plate shape, said apparatus comprising;
   a support portion for detachably supporting and rotating the recording medium;
   a recording-reference-light-beam-supplying-portion for supplying a coherent recording reference light beam propagating along an optical axis to a major surface of said recording medium;
   a signal-light-beam-supplying-portion for supplying a coherent signal light beam which is modulated in accordance with image data, in an optical path into the recording medium such that said signal light beam intersects with the recording reference light beam to produce an optical interference pattern with said reference and signal light beams within said recording medium;

a reproducing-reference-light-beam-supplying-portion for supplying into the recording medium a coherent reproducing reference light beam propagating in an opposite direction along said optical axis of the recording reference light beam to generate a phase conjugation wave from a refractive-index grating of the optical interference pattern;

a splitting portion for splitting the phase conjugation wave from the optical path of said signal light beam to image a dot pattern with the phase conjugation wave; and a photo-detecting portion for detecting the dot pattern imaged with said phase conjugation wave to reproduce the image data, wherein said reproducing reference light beam has an across-section having an area larger than that of said recording reference light beam.

2. A hologram recording and reproducing apparatus according to claim 1, wherein said reproducing-reference-light-beam-supplying-portion includes a reflector for reflecting the recording reference light beam passing through said recording medium back to said recording medium; and a shutter capable of cutting off said recording reference light beam and disposed in the optical path to said reflector.

3. A hologram recording and reproducing apparatus according to claim 1, further comprising a ½ wave plate disposed in the optical path of said reproducing reference light beam.

4. A hologram recording and reproducing apparatus according to claim 1, wherein said reproducing-reference-light-beam-supplying-portion includes a reflector for reflecting the recording reference light beam passing through said recording medium back to said recording medium; and a ¼ wave plate disposed in the optical path to said reflector.

5. A hologram recording and reproducing apparatus according to claim 1, wherein said recording medium is sensitive to a gate light beam having a wavelength shorter than that of the reference and signal light beams to develop light induced absorption, said apparatus further comprising a gate-light-beam-supplying-portion for supplying the gate light beam into the recording medium.

* * * * *